US004001753B2

United States Statutory Invention Registration [19]

[11] Reg. Number: H1753

[45] Published: Oct. 6, 1998

Warren et al.

[54] PIN AND CERMET HYBRID BIMODAL REACTOR

[75] Inventors: John W. Warren, Farifax County, Va.; Abraham Weitzberg, Montgomery County, Md.

[73] Assignee: The United States of America as represented by the United States Department of Energy, Washington, D.C.

[21] Appl. No.: 848,253

[22] Filed: Apr. 29, 1997

Related U.S. Application Data

[60] Provisional application No. 60/018,338 May 6, 1996.

[51] Int. Cl. [6] ..... G21D 5/02

[52] U.S. Cl. ..... 376/318; 376/397; 376/909

*Primary Examiner*—Daniel D. Wasil

*Attorney, Agent, or Firm*—William R. Moser; Judson R. Hightower; Paul A. Gottlieb

[57] ABSTRACT

A bimodal propulsion and power nuclear reactor with coaxial power and propulsion cores, each with its own primary propellant/coolant. An inner core region provides electrical power while an outer annular core region surrounding the inner core region has, passageways for heating a gaseous propellant.

24 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PIN AND CERMET HYBRID BIMODAL REACTOR

This application claims benefit of USC Provisional Appln. No. 60/018,338 filed May 6, 1996.

FIELD OF THE INVENTION

The invention relates generally to space nuclear power and propulsion reactors. Space nuclear power reactors heat a heat transfer medium which is circulated to an electrical power generator to provide electrical power for use in a spacecraft. Space nuclear propulsion reactors heat a propellant such as hydrogen to provide propulsive force to the spacecraft. The present invention combines these previously separately developed reactor concepts into a combined (bimodal) reactor, that will provide both electrical power and thermal propulsion to spacecraft. The term "reactor" is being used to include the fissionable nuclear fuel that generates energy.

BACKGROUND OF THE INVENTION

Nuclear propulsion reactors have long been considered for the propulsion of spacecraft. Variations of these nuclear propulsion reactors include that described in U.S. Pat. No. 5,289,512 to Pettus, which is directed to a two-pass system using a single propellant/coolant. Two separate coaxial core regions are in fluid communication with each other so that the propellant/coolant is directed through each core region in sequence. This enables improved thrust-to-weight ratios and exhaust temperatures. However, a separate power system is needed to provide the electrical power to operate the spacecraft.

U.S. Pat. No. 5,087,412 describes the use of hydrogen as a coolant, for a space nuclear reactor, and U.S. Pat. No 3,820,325 describes hydrogen as a propellant. Neither describe a bimodal reactor according to the present invention.

SUMMARY OF THE INVENTION

The present invention has developed a way of satisfying the competing requirements for power and propulsion and creating a bimodal nuclear reactor having a nuclear propulsion reactor component and a nuclear power generation reactor component which is capable of operating in an electrical power producing mode or in a propulsion mode. In particular, the present invention has created a nuclear reactor capable of providing both propulsion and power generation in a compact design suitable for use in a biomodal space reactor system.

The invention provides a bimodal nuclear reactor for providing electrical power and propulsion for space applications having (a) an inner core region containing a coolant that is liquid at reactor operating temperatures and can be circulated to electrical power generating means and (b) an annular outer core region surrounding the inner core region and having passageways for a gaseous propellant that is heated in said annular core and expelled into space through at least one nozzle, both inner and annular outer core regions containing fissile nuclear fuel and being separated by the walls of a metal vessel that contains the inner core region, there being a vacuum gap at the interface of said walls and said annular outer core region on the reactor end distant from said nozzle(s) and thermal insulation at said interface on the reactor end near to said nozzle(s). The vacuum gap between part of the interface of (a) the outer surface of the walls of the metal vessel containing the central power core and (b) the outer annular core, may be provided by channels in a refractory metal outershell which is pressed onto the exterior of said metal vessel. A plurality of cermet nuclear fuel elements may be provided outside the outershell.

The hybrid power-propulsion nuclear reactor of the present invention is therefore in the form of a reactor with nested, preferably coaxial, power and propulsion core regions, each with its own primary propellant/coolant. The outer annular core region is formed of nuclear fuel elements containing passageways for propellant and contains the other, interior core which contains nuclear fuel and coolant (e.g., lithium) for generating electrical power. This design allows the propulsion fuel and power fuel to be thermally and neutronically coupled in a single reactor structure. Thermal insulation may partially separate the two regions to help maintain a high temperature for heating the gaseous propellant.

The internal power core may be comprised of an array of fuel pins with niobium alloy. (i.e.—over 90% niobium) cladding and a rhenium inner liner while the external propulsion core that heats the, gaseous propellant may have a cermet nuclear fuel with refractory metal cladding. Uranium dioxide and uranium nitride may be used as fissile materials. The gaseous propellant (e.g., hydrogen) is expelled into space through a nozzle, thereby providing propulsive force to a spacecraft.

The invention makes possible a space nuclear reactor capable of both long-life (greater than 7 years) operation at a lower temperature as an electrical power source as well as short-term high temperature propulsion.

BRIEF DESCRIPTION OF THE DRAWINGS

For a further understanding of the present invention, reference should be made to the following description in conjunction with the accompanying drawings wherein.

DETAILED DESCRIPTION OF THE INVENTION

Figure 1A:
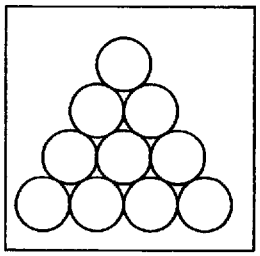
FIG. 1A is a detail view of the fuel in triangular pitch.

An object of the invention is to provide a space nuclear reactor capable of both long-life (7–10 years) operation at a lower temperature as an electrical power source as well as short-term high temperature propulsion. The present invention satisfies these requirement with a hybrid power-propulsion reactor. The hybrid bimodal power-propulsion reactor combines two separate fuel types for the generation of both power and propulsion. Each of the fuels has a separate and distinct primary coolant which does not come into contact with the other. A further object is to arrange the two fuel types so that each will perform within its prescribed operating limits with and without the presence of hydrogen coolant in the propulsion fuel portion of the reactor.

The two reactor fuel regions are mechanically joined such that approximately one-half of the interface surface between the regions maintains good thermal contact for the 10-year mission lifetime, while the other half can be thermally insulated to allow the heating of the propulsion fuel to well above 2000 K (degrees Kelvin) while maintaining the power fuel below 1400 K during both the power-only and propulsion/power operating modes. Design criteria for the reactor core system include the ability to heat hydrogen propellent in excess of 2000 K for a period of about 250 hours, and also to provide heat to be converted to electricity for a period of over 7 years. The inner and annular outer core regions are maintained in fluid isolation from each other so that the coolant for each region does not enter the other region.

The power portion of the core is preferably a central cylindrical vessel of refractory metal alloy containing an array of refractory alloy clad enriched uranium nitride fuel rods. One previously developed refractory alloy that meets the design criteria is the NblZr-0.1C alloy (commercial designation "PWC 11") of the previous space reactor programs (SNAP-50 and SP-100) used with a liquid lithium coolant. This is an alloy of niobium with 1% zirconium and 0.1% carbon. A rhenium internal liner may be bonded to the NblZr cladding to improve performance in the presence of fission products. The central cylinder may contain one or more reentrant thimbles for in-core control rods, if their use is necessary for reactor control or for maintenance of immersion subcriticality during potential accident scenarios.

Surrounding the central power region is an annular propulsion region comprised of an array of prismatic cermet (ceramic/metallic) fuel elements. The cermet may contain 60 volume percent $UO_2$ and 40 volume percent tungsten, for example. Preferred refractory cladding on the cermet fuel and hydrogen coolant tube materials are selected from the group consisting of tungsten, molybdenum-rhenium and tungsten-molybdenum-rhenium. In this invention the cross-section of the annulus region fuel elements is preferably a slightly tapered sector (for example, 30 times 12 degrees each equals 360 degrees) with the inner surface matching the outer face of the central power region. This permits good thermal contact and enhances the thermal conduction paths from the outer edge of the annulus to the interface between the propulsion annulus and the inner power region. While the preferred propellant is hydrogen, ammonia, steam, and carbon dioxide may also be used.

Methods of producing cermet nuclear fuel elements are known in the art. J. R. Tinklepaugh and W. B. Crandall, *CERMETS,* Reinhold Publishing Corp., New York, 1960, describe the production and properties of cermet materials. At page 193 they describe metal-$UO_2$ cermet nuclear fuel elements and how to make-them U.S. Pat. No. 3,661,769 describes tungsten and uranium nitride in a nonswelling cermet nuclear fuel element.

The outside of the propulsion fuel annulus is surrounded by a vessel that contains the hydrogen propellent and conducts it to the rocket nozzle. The material of the vessel can be a refractory alloy or a carbon-carbon composite with appropriate coatings and/or liners or a combination thereof. The design and layout of the rocket chamber and nozzle or nozzles, are not an integral part of this invention, as it does not affect the reactor performance and may also be dependent on the specific application of this invention. Similarly the inlet plumbing of the hydrogen propulsion coolant and the lithium power region coolant is also not an integral part of this invention.

An alternative embodiment of the invention (FIG. 6) has each of the cermet propulsion fuel elements joined to its own separate thrust nozzle and connected to a common inlet plenum. The details of the nozzles for exhausting the propellant to space and core connections to coolant or propellant supply are not an integral part of the invention.

As determined by thermal hydraulic calculations, the desired high hydrogen outlet temperatures can only be achieved if about half of the power-propulsion region interface, towards the high temperature hydrogen outlet, is insulated with a material such as molybdenum-zirconium oxide multifoil insulation.

The combination of PWC-11 clad uranium nitride power region fuel with a inner rhenium liner and a tungsten-$UO_2$ cermet propulsion fuel joined in intimate thermal contact at the low temperature end and insulated at the high temperature end is the preferred embodiment of this invention.

Figure 1:
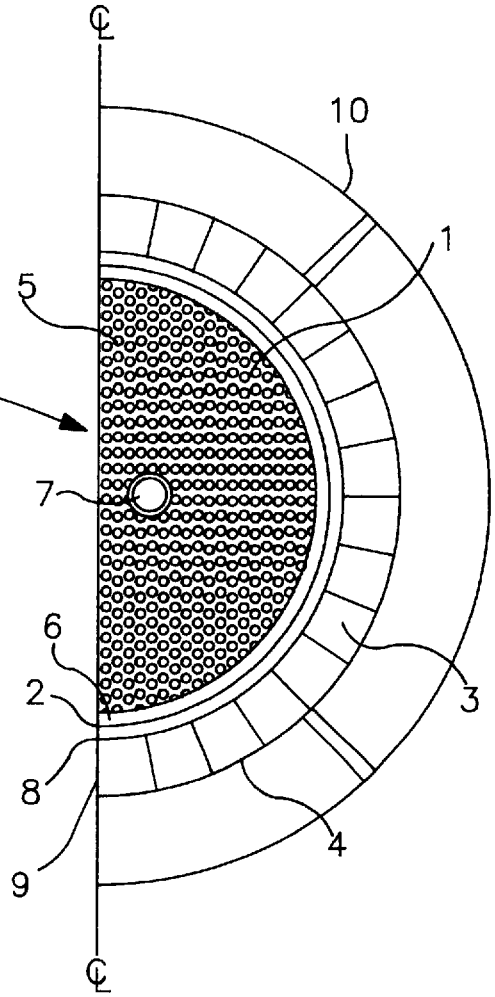
FIG. 1 depicts a cross-sectional schematic view of one embodiment of the bimodal power propulsion reactor of the present invention with an interior -power core region and an exterior propulsion core region.

Referring now to the drawings, initially to FIG. 1, where a planar cross-section is shown of the pin and cermet hybrid bimodal reactor, the reactor core consists of an inner power producing region 1 contained in power vessel 2, and an outer annular propulsion region 3 contained between vessel 2 and propellant containment vessel 4. Vessel 2 is made of refractory metal alloy and contains a number of fuel pins 5, clad in refractory alloy (not shown here) constrained by appropriate core internal supports (not shown here), and cooled by flowing liquid lithium 6. FIG. 1 shows the optional placement of reentrant refractory metal control rod thimbles 7, if, these are deemed necessary by the specific application of the invention. About half of the outer wall of vessel 2 is insulated using high temperature refractory metal multifoil insulation 8. The other half of the wall is thermally bonded to refractory metal clad propulsion fuel elements 9 in the annular propulsion region 3. If the inclusion of a vacuum gap were required for some applications of this invention, it could be an integral part of the interface between the inner power region and the outer propulsion region. Surrounding the propulsion fuel is the propellant containment vessel 4 which contains the hydrogen propellant. Outside of the propulsion vessel 4 are radial reflector elements 10 which may be fixed or sliding, depending on the specific application of the invention.

Figure 2:
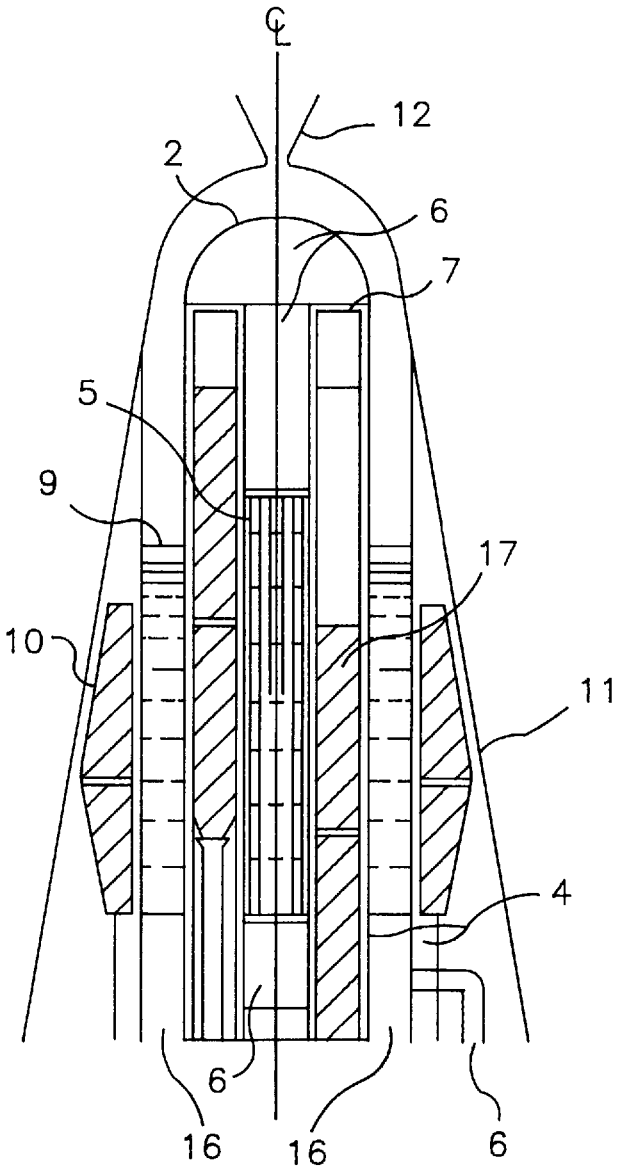
FIG. 2 depicts a cross-sectional schematic view of the reactor core of another embodiment of the hybrid power propulsion reactor of the present invention with an interior power region and an exterior propulsion region.

FIG. 2 shows an axial cross-section of a reactor containing a core as depicted in FIG. 1. In addition to the components described above, the flow paths for the lithium coolant 6 and hydrogen propellant 16 are shown. The propellant containment vessel 4 and reflector elements 10 are enclosed in a reentry shield 11, which is used in some space reactor designs to ensure intact reentry. In this configuration the cone-shaped reentry shield 11 transitions into the propulsion nozzle 12 which forms the outlet path for the hydrogen propellant. Optional in-core control rods 17 are shown in the reentrant thimbles 7.

Figure 3:
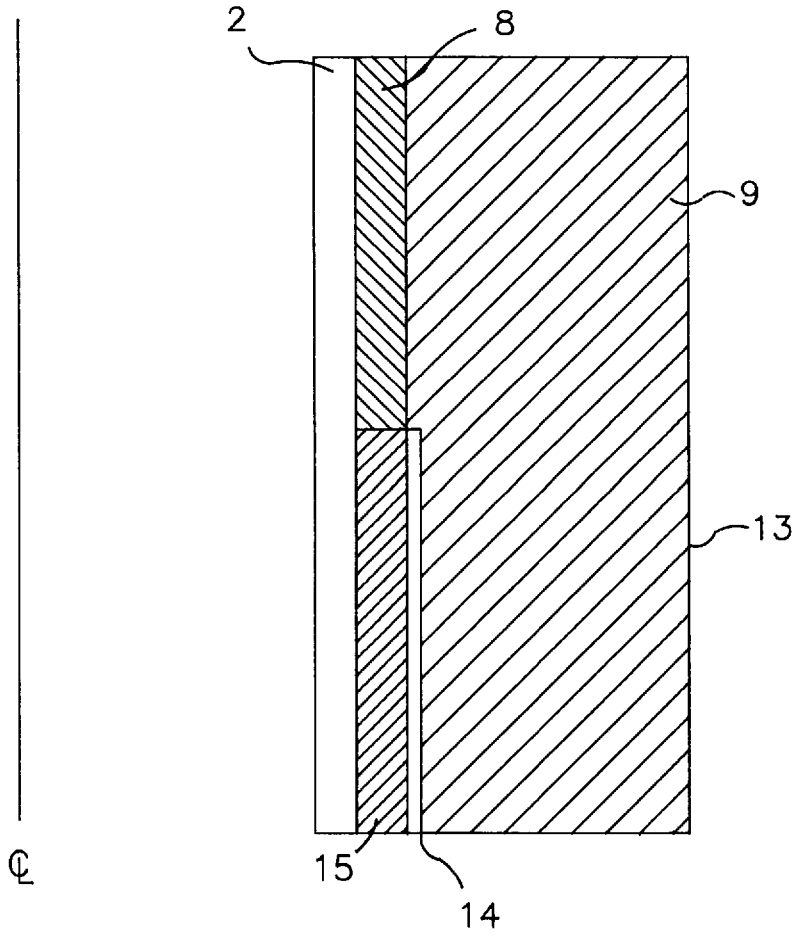
FIG. 3 depicts the interface between the power and propulsion reactor core regions.

FIG. 3 shows a detailed cross section of the power/propulsion region interface. To achieve the required high propellant temperatures, approximately one-half of the interface is thermally insulated using refractory metal multifoil insulation 8. To permit the reactor to provide power in the absence of the flowing hydrogen coolant, it is necessary to maintain an intimate thermal contact between the refractory metal power vessel 2 and the propulsion fuel elements 9. This is accomplished using high-temperature clamping straps 13 together with high temperature brazing-or appropriate intermetallic compounds 14, to join the propulsion fuel elements 9 to a precisely machined reactor vessel refractory metal outer wall 15 that had been previously joined to the power vessel 2 by means of the hot isostatic pressure (HIP) process or other appropriate processes. If it is desired to include a vacuum gap between the inner and outer core region to channel away any diffused hydrogen, the gap could be incorporated into the refractory metal outer wail 15, e.g., by channels within the wall connected to space vacuum.

Figure 4:
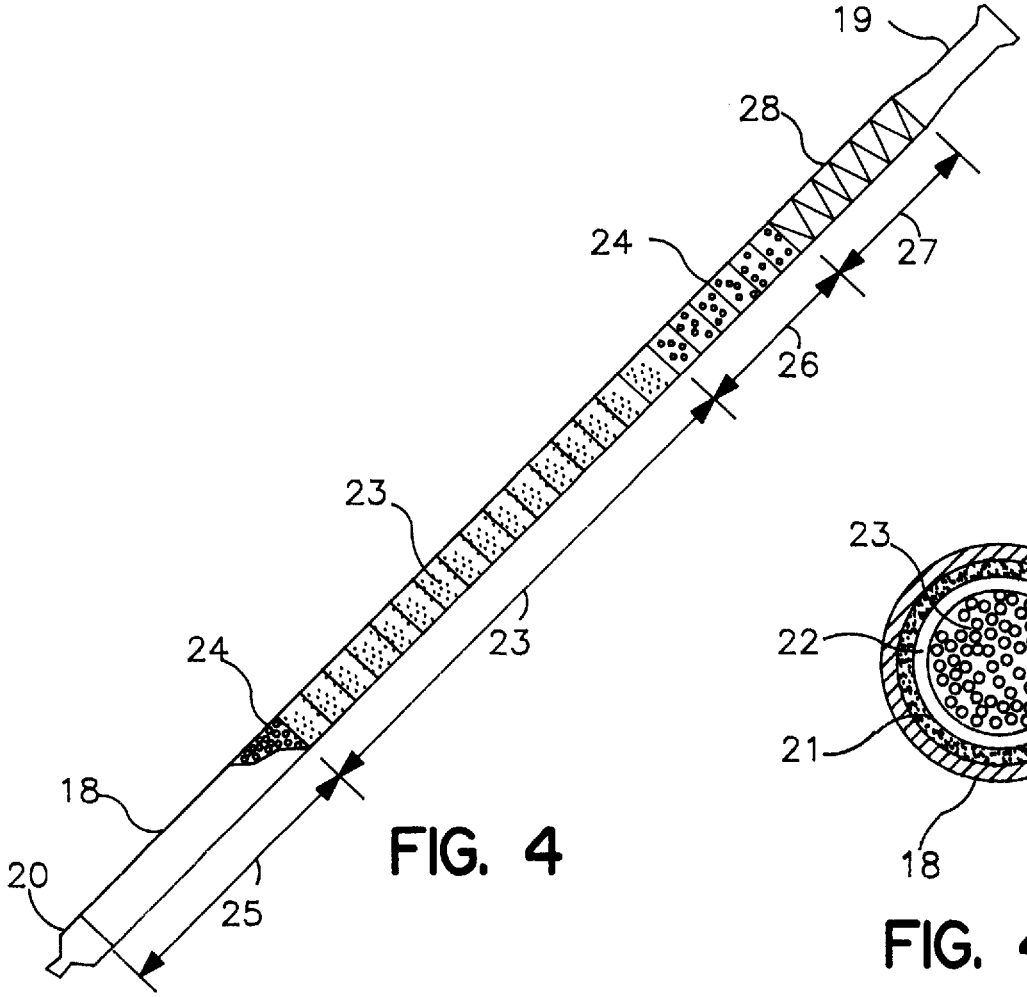
FIG. 4 depicts a fuel element ("pin") of the power reactor core region.
Figure 4A:
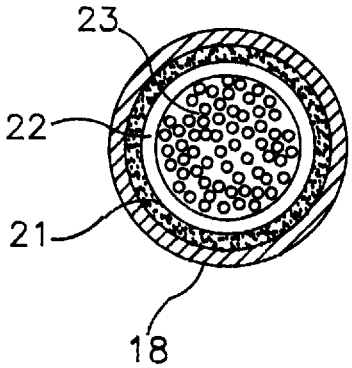
FIG. 4A is a cross-section view of the power fuel pin of FIG. 4.

FIG. 4 shows some details of the power fuel pin. The pins are clad 18 with a niobium-one percent zirconium (NblZr) alloy, such as PWC-11, which is the same material used for the forward 19 and aft 20 end plugs. A rhenium liner 21 is internal to the cladding, and is either free standing or bonded to the NblZr by the hot isostatic pressing process. Internal to the liner 21 is a helium filled gas gap 22 and the UN fuel pellets 23, and BeO internal reflector pellets 24 which form an aft axial internal reflector 25 and a forward axial internal reflector 26. In the fuel pin forward of the forward reflector 26 is the fission gas plenum 27 that also contains a spring 28 that restrains the fuel pellet from moving during transportation and launch.

Figure 5:
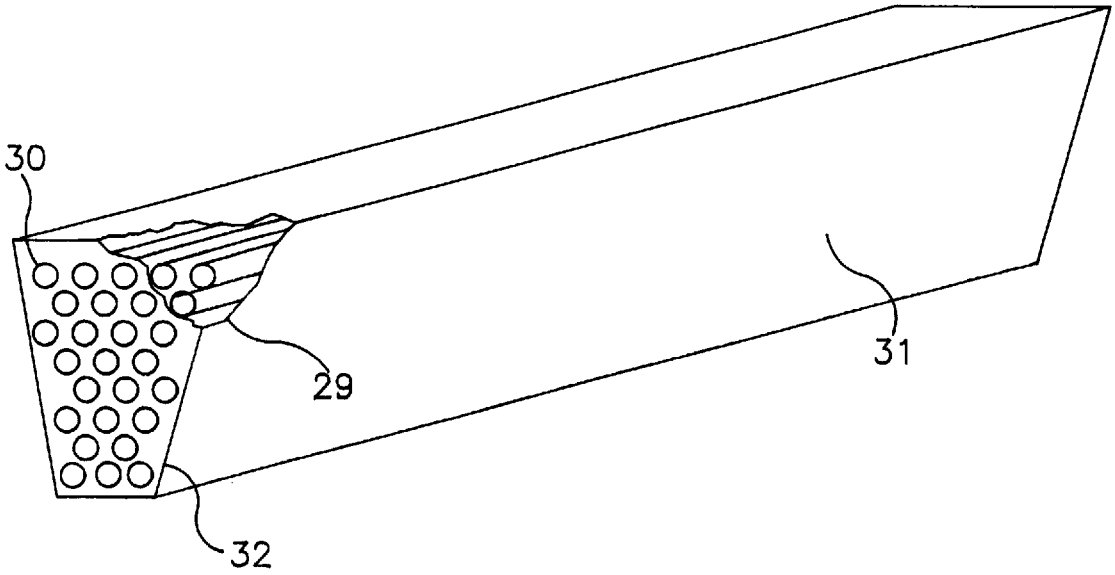
FIG. 5 depicts a cermet fuel element of the propulsion reactor core region.

FIG. 5 shows some detail of the cermet propulsion fuel elements. The cermet fuel matrix 29 is made of $UO_2$ and tungsten particles that are pressed and centered into the desired wedge shapes. Holes are drilled to accommodate the refractory metal propellent tubes 30. The tubes and cermet compacts are then assembled within refractory metal cladding 31 and end plates 32. The joints are welded by electron beam or other suitable techniques and the entire fuel element is then subjected to the hot isostatic pressing process which bonds the cermet fuel 29 to the propellent tubes 30, the cladding 31, and the end plates 32.

Figure 6:
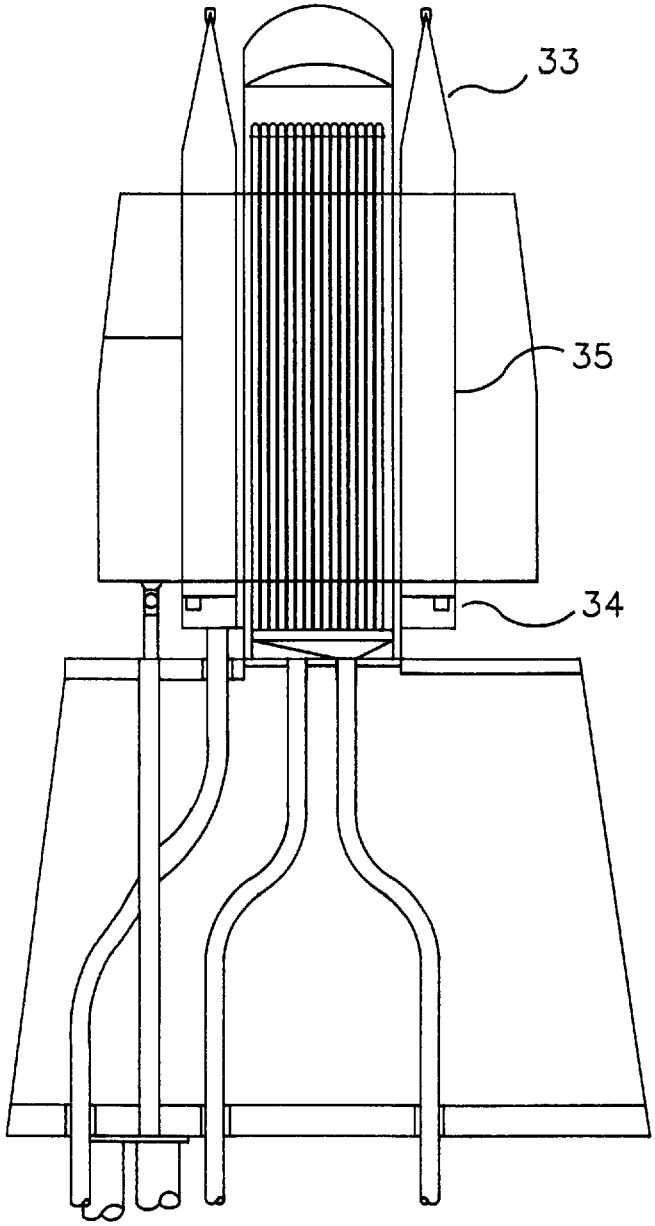
FIG. 6 depicts an alternate embodiment in which each cermet has its own nozzle for venting the propellant to space.

In the longitudinal section of the alternate reactor design depicted in FIG. 6, each cermet fuel element (35) has its own nozzle 33 for venting propellant to space and is connected to a common inlet plenum 34.

The foregoing description of a preferred embodiment of the invention has been presented for purposes of illustration and is not intended to be exhaustive or to limit the invention to the precise form disclosed. It was chosen and described in order to explain the principles of the invention and their practical application to thereby enable others skilled in the art to utilize the invention in various embodiments and with various modifications. It is intended that the scope of the invention be defined by the claims appended hereto.

We claim:

1. A nuclear reactor that will provide heat for conversion to electricity and direct nuclear thermal propulsion by heating a propellant, having first and second separate reactor core regions, coupled thermally and neutronically, the first core region being a central power core region having a nuclear fuel and coolant for generating electrical power, and the second core region being an annular propulsion core region surrounding the first core region and having a nuclear fuel capable of heating a gaseous propellant, with passageways for the gaseous propellant, said passageways being separate from the coolant path in the first core region.

2. The nuclear reactor of claim 1 wherein the nuclear fuel in said first core region is an array of fuel pins, each fuel pin comprising a compound of uranium encased in metallic cladding, and the nuclear fuel in said second core region is a cermet material containing a compound of uranium.

3. The nuclear reactor of claim 2 wherein said cermet material and said passageways for gaseous propellant in said second core region have refractory metallic cladding.

4. The nuclear reactor of claim 3 wherein said refractory metallic cladding is selected from the group consisting of tungsten, molybdenum-rhenium alloy, and tungsten-molybdenum-rhenium alloy.

5. The nuclear reactor of claim 3 wherein said passageways are refractory metallic tubes within the cermet fuel elements, opening on the ends of said cermet fuel elements.

6. The nuclear reactor of claim 2 wherein-the first core region is cooled by a coolant that is liquid at reactor operating temperatures.

7. The nuclear reactor of claim 6 wherein the coolant is lithium.

8. The nuclear reactor of claim 2 wherein said compound of uranium in said fuel pins is uranium nitride.

9. The nuclear reactor of claim 8 wherein said uranium nitride is alloyed with titanium or zirconium.

10. The nuclear reactor of claim 2 wherein said metallic cladding on said fuel pins is an alloy of niobium containing over 90% niobium.

11. The nuclear reactor of claim 10 wherein said alloy of niobium contains zirconium.

12. The nuclear reactor of claim 10 wherein said niobium cladding alloy has an inner liner of rhenium.

13. The nuclear reactor of claim 2, further comprising (a) a closed reactor vessel containing said first core region and (b) an outer propellant containment vessel surrounding said second core region and having at least one thrust nozzle for conducting said gaseous propellant to space.

14. The nuclear reactor of claim 13, further comprising reflector elements outside of said propellant vessel.

15. The nuclear reactor of claim 2, further comprising control rods contained in reentrant thimbles in said first core region.

16. The nuclear reactor of claim 2 wherein said compound of uranium in said cermet material is uranium dioxide ($UO_2$) or uranium nitride (UN).

17. The nuclear reactor of claim 2 wherein said gaseous propellant is hydrogen.

18. The nuclear reactor of claim 2 further containing thermal insulation at the part of the interface between said first and second core regions closer to the nozzle for exhausting the propellant.

19. The nuclear reactor of claim 18 further having a vacuum gap in the noninsulated area of to interface for channeling any diffused propellant to space.

20. The nuclear reactor of claim 18 wherein said thermal insulation is molybdenum-zirconium oxide multifoil insulation.

21. A nuclear reactor that will provide heat for conversion to electricity and direct nuclear thermal propulsion by heating a gaseous propellant, having first and second separate reactor core regions, coupled thermally and neutronically, the first core region being a central power core region having an array of nuclear fuel pins and lithium coolant for circulation to an electrical power generating means, each fuel pin comprising uranium nitride nuclear fuel encased in metallic cladding consisting essentially of an alloy of niobium and zirconium, and the second core region being an annular propulsion core region surrounding the first core region and having a cermet nuclear fuel containing uranium nitride or uranium oxide capable of heating a gaseous propellant, with passageways for the gaseous propellant, said passageways being separate from the coolant path in the first core region, said cermet being encased in a refractory metal cladding.

22. A bimodal nuclear reactor for providing electrical power and propulsion for space applications having (a) an inner core region containing a coolant that is liquid at reactor operating temperatures and can be circulated to electrical power generating means and (b) an annular outer core region surrounding the inner core region and having passageways for a gaseous propellant that is heated in said annular core and expelled into space through at least one nozzle, both inner and annular outer core regions containing fissile nuclear fuel and being separated by the walls of a metal vessel that contains the inner core region, there being a vacuum gap at the interface of said walls and said annular outer core region on the reactor end distant from said nozzle(s) and thermal insulation at said interface on the reactor end near to said nozzle(s).

23. The reactor of claim 22 wherein said gaseous propellant is selected from the group consisting of hydrogen, ammonia, steam, and carbon dioxide.

24. The reactor of claim 22 wherein said inner core region is capable of heating coolant for electrical power generation for seven years and said annular outer core region is capable of heating a gaseous propellant to a temperature of more than 2000 degrees Kelvin for 250 hours.

* * * * *